United States Patent [19]

Lawson, II et al.

[11] 4,371,496
[45] Feb. 1, 1983

[54] POSITION INDICATION SYSTEM

[75] Inventors: Charles A. Lawson, II, Linthicum Heights, Md.; Wayne L. Dufek, Stewartstown, Pa.

[73] Assignee: Westinghouse Electric Corp., Pittsburgh, Pa.

[21] Appl. No.: 160,528

[22] Filed: Jun. 18, 1980

[51] Int. Cl.³ ............... G21C 17/00; G01R 33/00
[52] U.S. Cl. ........................ 376/258; 324/207; 324/208
[58] Field of Search ........... 176/19 R, 19 EC, 19 J, 176/36 R; 324/207, 208; 340/199, 179; 376/258

[56] References Cited

U.S. PATENT DOCUMENTS

| | | | |
|---|---|---|---|
| 3,158,766 | 11/1964 | Frisch | 176/36 R |
| 3,846,771 | 11/1974 | Young et al. | 176/19 R |
| 3,858,191 | 12/1974 | Neuner et al. | 176/19 EC |
| 3,858,199 | 12/1974 | Neuner et al. | 176/19 R |
| 3,890,607 | 6/1975 | Pelenc et al. | 176/19 R |
| 3,893,090 | 7/1975 | Neuner et al. | 176/19 EC |
| 3,895,223 | 7/1975 | Neuner et.al. | 176/19 R |
| 3,895,351 | 7/1975 | Neuner et al. | 176/19 R |
| 4,170,754 | 10/1979 | Schmitz et al. | 176/19 R |
| 4,201,940 | 5/1980 | Dardenne | 176/19 R |

*Primary Examiner*—Sal Cangialosi
*Attorney, Agent, or Firm*—D. Schron

[57] ABSTRACT

A nuclear reactor control rod position system wherein the control rods are connected to drive rods movable within a group of detector coils. Bilateral switches are connected to the respective coils of the detectors and a control circuit sequentially provides an enabling control signal to the various groups of bilateral switches connected to the respective detectors so that the coils of each detector in turn are connected to a single signal processing circuit which may be located inside or outside the containment structure of the reactor.

5 Claims, 5 Drawing Figures

POSITION INDICATION SYSTEM

BACKGROUND OF THE INVENTION

1. Field of the Invention

The invention in general relates to position indication systems, and particularly to a system for determining the position of control rods within a nuclear reactor.

2. Description of the Prior Art

Various systems exist which include members which move between set limits with a requirement for remotely sensing the position of the movable member. For example, in the field of nuclear reactors, it is necessary to raise and lower control rods within the reactor core for controlling the energy output of the nuclear reactor.

In one type of system, the control rods are relatively moved into and out of the reactive region (the nuclear core) positioned within a pressure vessel, with the control rods being connected to respective drive rods. These drive rods are movable within respective sealed pressurized rod travel housings and longitudinal movement is imparted by means of a drive mechanism.

Inasmuch as the control rod is connected to the drive rod, an indication of control rod position may be obtained by detecting the position of the drive rod as it moves within its housing. The position of the drive rod within its housing is obtained without any penetration of the housing by means of a detector assembly having a plurality of coils disposed around the housing and along the path of movement of the drive rod. The materials are such that as a rod is moved through the center of a coil, the impedance of the coil will noticeably change. The coils are connected to signal processing apparatus for detecting this change to thereby provide an indication of drive rod, and therefore control rod position.

The signal processing apparatus is located in the same containment structure that includes the nuclear reactor and along with other signal processing circuitry, interacts with a remote central control station. A typical installation may have between 30 and 70 drive rods and associated detectors such that a relatively large number of signal processing circuits are required in the containment environment.

In many instances, it would be desirable to minimize the signal processing equipment required within the containment structure and even to remove it therefrom entirely. The present invention accomplishes such objective.

SUMMARY OF THE INVENTION

A position detection system is provided for detecting the relative positions of a plurality of members movable between first and second limits within respective housings. The system includes a plurality of detectors, each detector having at least a first group of sensors disposed along the path of movement of a respective movable member for detecting its presence. The sensors are connected to an AC operating signal and provide some manifestation of the presence or absence of a movable member. Means are further provided for sequentially placing the groups of sensors of respective detectors in signal communication with a signal processing means which, in response to the sensor manifestations, is operable to allow the member position to be computed.

In a specific embodiment, the movable members are drive rods of a nuclear reactor and the sensors are in the form of a plurality of coils surrounding the drive rod housing.

DESCRIPTION OF THE PREFERRED EMBODIMENT

Although the present invention finds applicability with a variety of systems which require the monitoring of a movable member between first and second limits, it will be described by way of example with respect to a control rod positioning system for a nuclear reactor.

Figure 1:
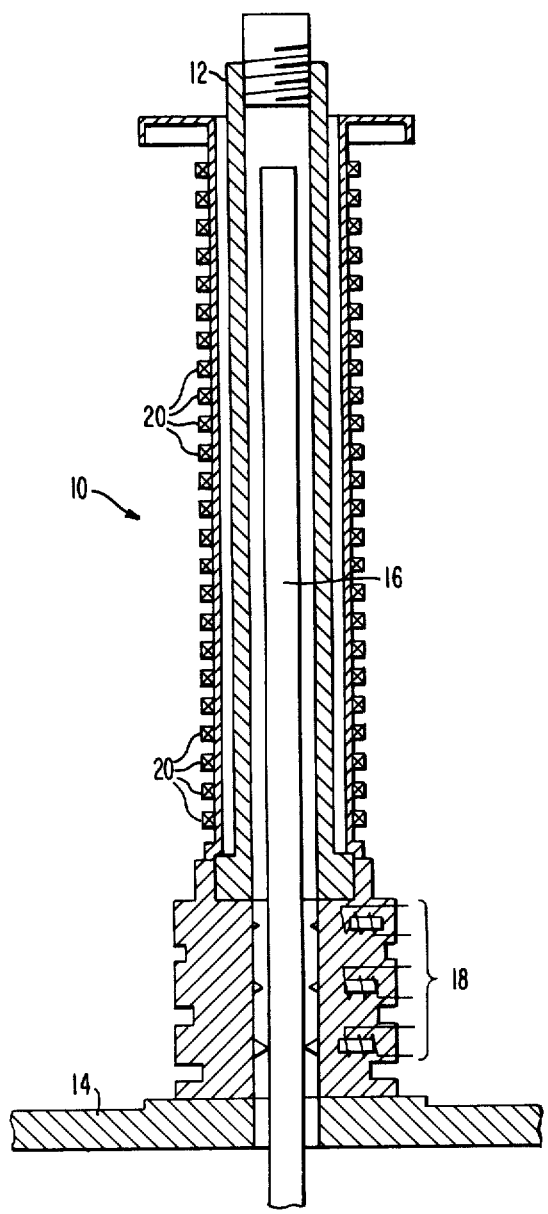
FIG. 1 is a sectional view of a reactor drive rod assembly and its housing, and further illustrates a typical multi-coiled detector arrangement.

In FIG. 1, there is illustrated a detector assembly 10 disposed about a rod travel housing 12 of a nuclear reactor pressure vessel, a portion of the head of which is indicated by numeral 14. A drive rod 16 is positioned within the housing 12 for movement between upper and lower limits as governed by a drive mechanism 18.

Figure 2:
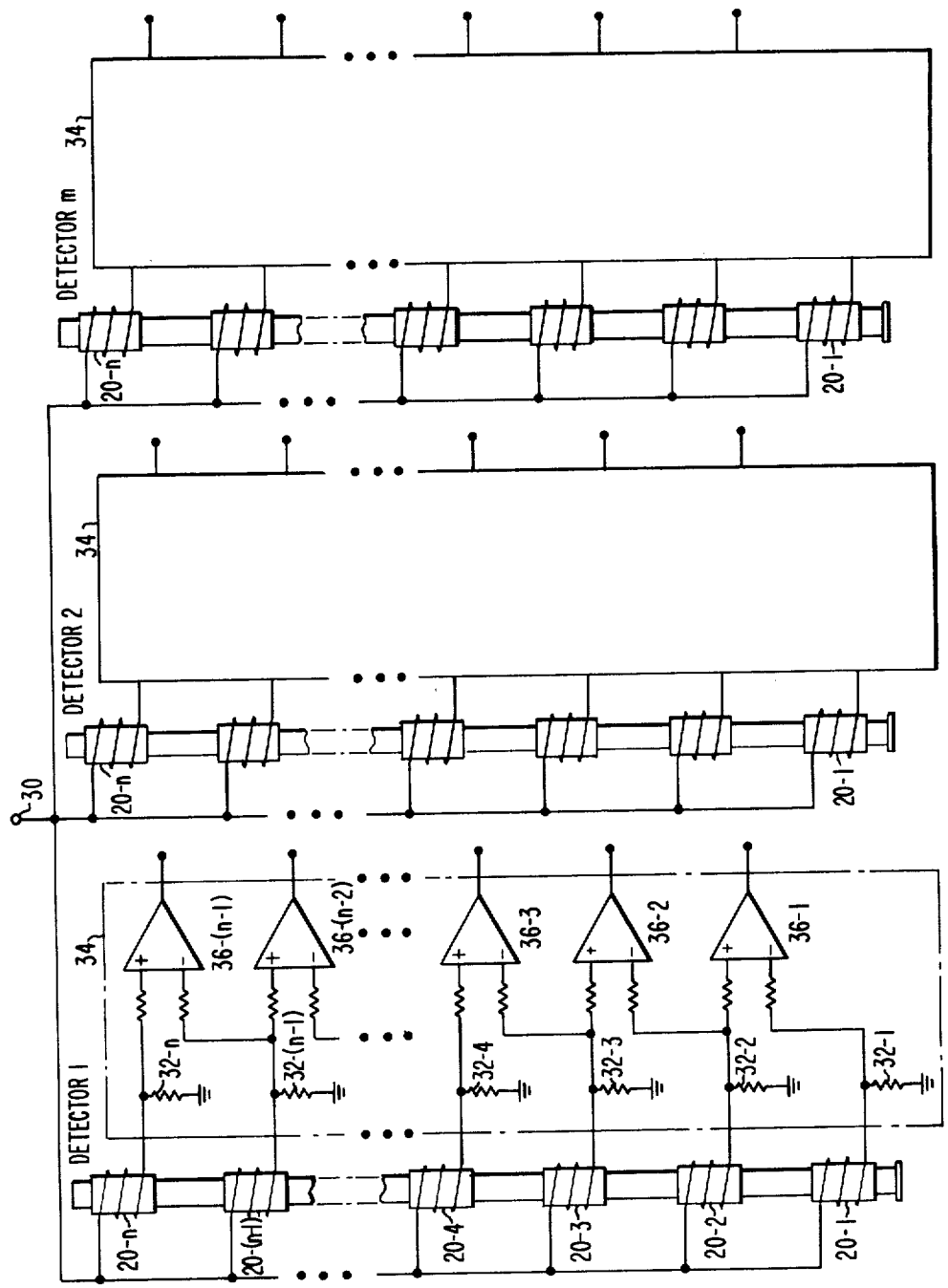
FIG. 2 is a circuit diagram illustrating a prior art operation of the detectors.

The detector assembly 10 includes a plurality of sensors in the form of coils 20 surrounding rod travel housing 12 and disposed along the path of movement of drive rod 16. An AC signal is provided to the coils thereby creating an AC flux which penetrates through the rod travel housing 12. As the drive rod, which may be of ferromagnetic material, passes through the center of a respective coil, it will cause the impedance of the coil to change and signal processing means are provided to detect this change so as to give an indication of the rod position. (A basic coil construction and variations thereof as well as different types of signal processing apparatus are described in U.S. Pat. Nos. 3,846,771; 3,858,191; 3,858,199; 3,893,090; 3,895,223; 3,895,351, and a typical drive mechanism is described in U.S. Pat. No. 3,158,766, all of said patents being assigned to the assignee of the present invention.) One type of system currently in use is illustrated in FIG. 2, to which reference is now made.

A typical installation includes m separate rod travel housings, and accordingly m detectors, with each detector having n coils. By way of example, m=60 and n=42.

Examining detector 1 as exemplary, each of the coils 20-1 to 20-n has one end connected to terminal 30, to which is applied an AC signal. Each coil has its other end connected to respective resistors 32-1 to 32-n of signal processing apparatus 34.

The signal processing apparatus 34 additionally includes a plurality of differential amplifiers 36-1 to 36-(n-1), each having first and second inputs with the electrical connections being such that adjacent coils are connected to respective first and second inputs of the respective differential amplifiers. That is to say, adjacent coils 20-1 and 20-2 are connected to the first and second inputs of differential amplifier 36-1. The next adjacent coils 20-2 and 20-3 are connected to the first and second inputs of differential amplifier 36-2. Since the first and second coils are connected to a first differential amplifier, there is one less differential amplifier than the total number of coils such that the last two coils 20-(n-1) and 20-n are connected to the first and second inputs of differential amplifier 36-(n-1).

More particularly, the AC current through the coils develops voltage drops across the respective resistors 32-1 to 32-n and it is these voltages which are applied to the respective first and second inputs of the various differential amplifiers.

The presence of the drive rod within a coil alters the coils impedance and the resulting current therethrough and voltage drop across its particular resistor. By way of example, suppose that the drive rod is in its lowermost position between coils 20-1 and 20-2. In this position, only coil 20-1 experiences a change in impedance such that the signals applied to the respective first and second inputs of differential amplifier 36-1 are different so as to cause an output signal thereof indicative of the drive rod position in its lower limit. The remaining coils 20-2 to 20-n are unaffected by the drive rod and accordingly the first and second input signals to the respective remaining differential amplifiers will be equal, and accordingly no output signals will be provided thereby.

At the other extreme, when the drive rod is in its uppermost limit between coils 20-(n-1) and 20-n, the impedance of the coils will be affected such that the voltages across respective resistors 32-(n-1) and 32-n will be different so that an output signal will be provided by the last differential amplifier 36-(n-1) indicating that the drive rod is in its upper limit of travel. While in this position, each of the preceding coils will have changed their impedance due to the presence of the drive rod, however, the change of impedance will be the same for all of these coils such that the voltage drop across their respective resistors will be the same, as will be the first and second inputs to the respective other differential amplifiers.

Intermediate positions of the drive rod will always cause one out of the series of differential amplifiers to provide an output signal to the exclusion of the others thereby definitely indicating the drive rod position.

In another embodiment, as brought out in some of the aforementioned patents, two groups of coils are utilized for each detector with the coils being arranged in an interleaved array with the signals from each group being similarly processed in separate independent signal processing apparatus, with the signals from one group being indicative of the element's position to within one half of the overall system's resolution. Signals are combined to then provide full resolution of the element's position.

In the arrangement of FIG. 2, the remaining detectors, detector 2 to detector m, and their associated signal processing apparatus 34 operate in an identical manner as previously described with respect to detector 1.

Figure 3:
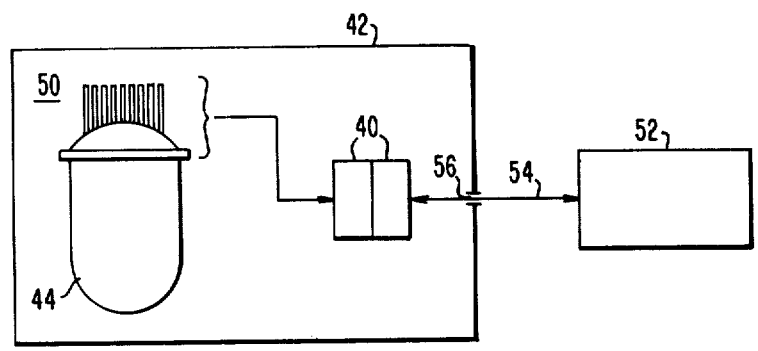
FIG. 3 is a diagram illustrating the physical placement of certain equipment relative to the operation of the apparatus of FIG. 2.

As depicted in FIG. 3, the signal processing apparatus 34 for each detector as well as other circuitry for processing the detector signals is physically located within a plurality of cabinets 40 situated within a containment structure 42 which also houses the nuclear reactor 44.

The detector array 50 communicates with the electronics in cabinets 40 as does signal processing equipment in a remote control room 52. This latter communication is accomplished by means of the two-way data link 54. In order to reduce the number of containment penetrations 56, the detector signals are encoded and multiplexed for transmission along data line 54. Under certain circumstances, it would be desirable to reduce the amount of signal processing equipment provided and to have the option of physically placing such signal processing apparatus outside of the containment structure 42. To accomplish this with the prior art arrangement of FIG. 2 would require thousands of individual penetrations (accomplished through the use of hundreds of multi-pin penetrator units).

Figure 4:
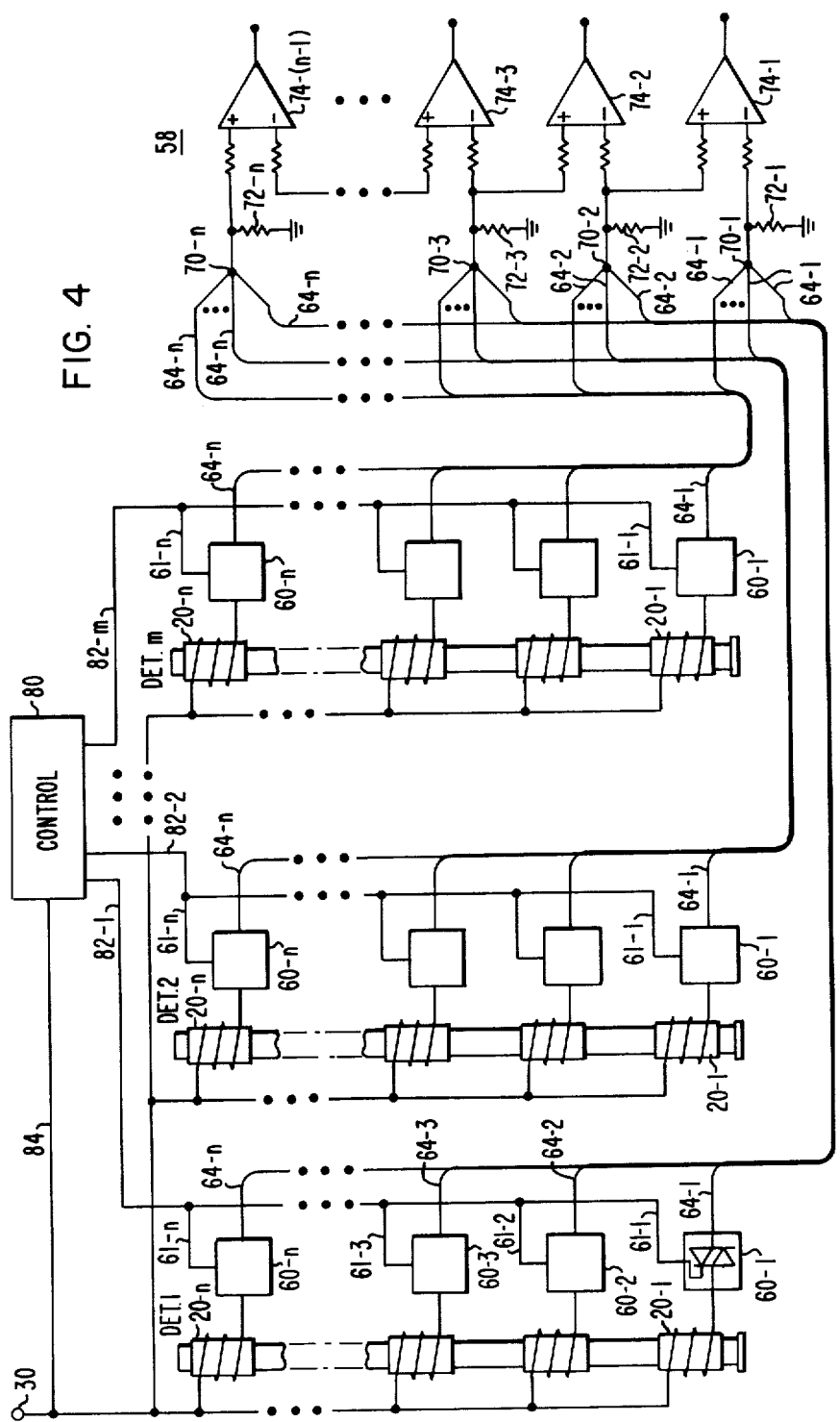
FIG. 4 is a circuit diagram of one embodiment of the present invention.

FIG. 4 illustrates an embodiment of the present invention which accomplishes the objective of an overall reduction in the number of components so as to allow for, if desired, the placement of the bulk of the signal processing equipment outside of the containment structure. The detectors of FIG. 4 are identical to those described with respect to FIG. 2 insofar as each detector includes at least a first group of coils 20-1 to 20-n, each having one end connected to terminal 30 for receiving an AC signal. In the arrangement of FIG. 4, however the other ends of the coils are not connected to separate and individual signal processing apparatus circuitry for each detector but rather, all of the coils of all of the detectors are connected to a common signal processing apparatus 58 by means of respective bilateral switches 60-1 to 60-n for each detector. The bilateral switches 60 include respective control electrodes 61-1 to 61-n for receipt of a control signal to enable bilateral, that is AC, conduction of the switch. One form of such bilateral switch is known as a triac, a device well known to those skilled in the art.

The connection of the coils to the signal processing apparatus 58 also includes, in addition to the bilateral switches, respective leads 64-1 to 64-n in a manner such that all of the same numbered leads of all of the detectors 1 to m are connected to the same respective common terminal point 70-1 to 70-n located within the signal processing apparatus 58. Thus common terminal point 70-1 is connected to each lead 64-1 of m detectors, common terminal point 70-2 is connected to each of the leads 64-2 of m detectors, as are the remaining common terminal points each being connected to m leads of the respective same number designation.

The common terminal point 70-1 to 70-n are in turn connected to respective resistors 72-1 to 72-n which develop signals for application to a series of differential amplifiers 74-1 to 74-(n-1) in a manner similar to that described with respect to signal processing apparatus 34 of FIG. 2. In the present arrangement, however, only (n-1) differential amplifiers are required as opposed to m×(n-1) as required by the prior art. When the bilateral switches connected to a particular detector are enabled for bilateral conduction, the arrangement is such that adjacent coils are electrically connected to respective first and second inputs of respective differential amplifiers in a manner that one and only one of the series of amplifiers will provide an output signal, as previously explained, in accordance with the position of the control rod of the particular detector in signal communication with the signal processing apparatus 58.

The enabling of the various bilateral switches associated with the detectors is accomplished with the provision of a control circuit 80 operable to sequentially provide an enabling control signal on lines 82-1 to 82-m so as to enable bilateral conduction of a first set of bilateral switches 60-1 to 60-n associated with a particular detector and to thereafter enable the remaining sets of switches, in sequence, so that only one detector at a time is placed into signal communication with the signal processing apparatus 58. When the last of the detectors is thus communicated with the signal processing apparatus, the scanning process may be repeated.

Since an AC signal is applied at terminal 30 to all of the coils, it would be desirable to reduce or eliminate any transient or in-rush current which might occur should the bilateral switches be enabled other than on a zero crossing of the AC signal. Accordingly, control circuit 80 is responsive to the AC input signal via lead 84 so as to provide an enabling control signal on one of the leads 82-1 to 82-m at a time when the instantaneous voltage of the AC signal applied to the coils has a value of zero. One of various ways of accomplishing this operation of the control circuit is illustrated in somewhat more detail in FIG. 5.

Figure 5:
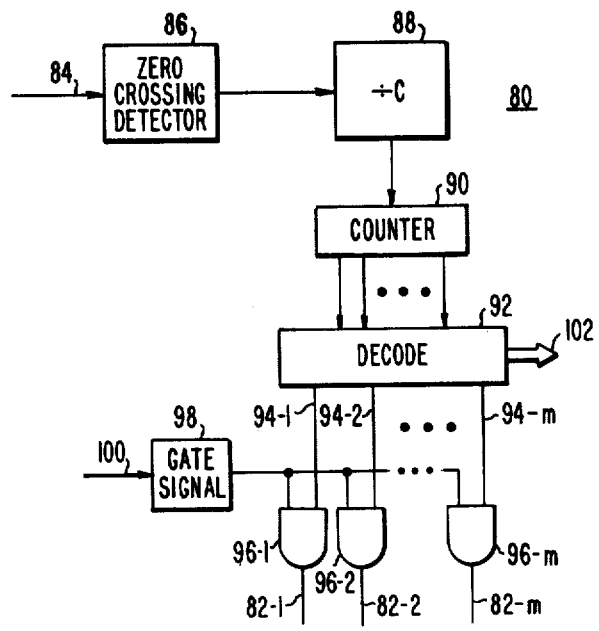
FIG. 5 is a block diagram illustrating the control circuitry of FIG. 4 in somewhat more detail.

To accomplish the one at a time enabling of the bilateral switch groups when the AC signal applied to the coil passes through zero, the control circuit 80 illustrated in FIG. 5 includes a zero crossing detector 86 operable to receive the AC signal on line 84 to provide a corresponding output pulse when the AC signal passes through zero. Such zero crossing detectors are well known to those skilled in the art. The output of the zero crossing detector is divided down by a "divide by c" circuit 88 which will provide an output signal to counter 90 after c zero crossings of the AC signal. For example, if switching between groups of bilateral switches is desired on every one cycle of AC input signal, then the divide circuit 88 may take the form of a flip flop, in which case, c would equal 2. The output of counter 90 is provided to a decode circuit 92 operable to provide an enabling signal on one of its plurality of output lines 94-1 to 94-m.

Although the signals on these lines 94-1 to 94-m may be utilized as the control signals for enabling bilateral conduction of the switches 60-1 to 60-n, an extra tier of control is afforded with the provision of a plurality of AND gates 96-1 to 96-m operatively connected to receive the signals on respective lines 94-1 to 94-m. All of these AND gates are additionally provided with a signal from the gate signal generator 98 which may receive a disable signal from the central control by way of line 100. In order to provide an indication of which set of bilateral switches is enabled, and accordingly, which detector is providing a position indication, the decode circuit 92 additionally provides its output signal to the central control, as indicated by data link 102.

Thus, in the example given, every cycle of the input AC signal will cause counter 90 to advance by one, with this count being translated to an individual enabling signal by means of decode circuit 92. If there are m detectors, counter 90 would be operable to reset after m counts. AND gates 96-1 through 96-m with the provision of an enabling signal from gate signal generator 98 will therefore provide the control signal sequentially on lines 82-1 through 82-m with the control signal being stepped from one line to the next on each full cycle of AC input signal. By way of example, if m=60, all of the detectors would be scanned in one second, although it is evident that this scanning time can be varied by the choice of the value of c in the divide circuit 88.

The present arrangement significantly reduces the circuitry required over that of the prior art. In addition, the arrangement allows the signal processing circuit such as 58 in FIG. 4, as well as control circuit 80, to be physically located outside of the containment structure. Although this arrangement somewhat increases the number of penetrations over that of the prior art of FIG. 2, it is far less than the thousands of penetrations that would be required if the signal processing circuitry of the prior art were placed outside of the containment structure. This physical placement outside of the containment structure not only allows for ease of servicing of the circuitry, but additionally allows for circuit components of less demanding specifications.

We claim:

1. A position detection system for a plurality of longitudinally movable members each movable within respective housings between first and second limits, comprising:
   (a) a plurality of detectors each having at least a first group of coils disposed along the path of movement of a respective movable member, each said coil experiencing a change of impedance when in proximity to said member;
   (b) each said coil having first and second ends;
   (c) means for connecting the first ends of all of said coils to a source of AC signal;
   (d) a plurality of differential amplifiers each having first and second inputs;
   (e) means connecting adjacent ones of said coils of each said detector to first and second respective inputs of a respective differential amplifier of said above plurality;
   (f) said connecting means including a plurality of sets of bilateral switches, each set connected to the second ends of respective coils of a detector with each switch having input means for receiving a control signal to enable bilateral conduction of said switch;
   (g) control means for supplying said control signal to individual sets of said switches, in sequence.

2. Apparatus according to claim 1 wherein:
   (a) said movable member is a control rod of a nuclear reactor; and
   (b) said coils are arranged such that said rod moves through the centers thereof.

3. Apparatus according to claim 2 wherein:
   (a) there are m detectors;
   (b) there are n coils per group;
   (c) there are n×m bilateral switches; and
   (d) there are (n-1) differential amplifiers.

4. Apparatus according to claim 1 wherein:
   (a) like numbered coils are connected through their respective bilateral switches to respective common terminal points; and which includes
   (b) a plurality of resistors each connected between a respective one of said common terminal points and a point of reference potential.

5. Apparatus according to claim 1 wherein:
   (a) said control means is operable to supply said control signal only on zero-crossings of said AC signal.

* * * * *